United States Patent [19]
Huver et al.

[11] Patent Number: 5,700,891
[45] Date of Patent: Dec. 23, 1997

[54] LOW-ODOR ADHESIVE COMPOSITION COMPRISING (METH) ACRYLATES CONTAINING URETHANE GROUPS

[75] Inventors: Thomas Huver, Duesseldorf; Carsten Friese, Hamburg; Winfried Emmerling, Neuss; Michael Kux, Monheim; Kerstin Motzkat, Oberhausen, all of Germany

[73] Assignee: Henkel Kommanditgesellschaft auf Aktien, Duesseldorf, Germany

[21] Appl. No.: 649,589

[22] PCT Filed: Nov. 22, 1994

[86] PCT No.: PCT/EP94/03848

§ 371 Date: Jun. 28, 1996

§ 102(e) Date: Jun. 28, 1996

[87] PCT Pub. No.: WO95/14725

PCT Pub. Date: Jun. 1, 1995

[30] Foreign Application Priority Data

Nov. 26, 1993 [DE] Germany .................. 43 40 095.7

[51] Int. Cl.$^6$ ..................................................... C08F 26/02
[52] U.S. Cl. ................................... 526/301; 526/270
[58] Field of Search ............................................... 526/301

[56] References Cited

U.S. PATENT DOCUMENTS

| | | |
|---|---|---|
| 3,630,962 | 12/1971 | Stapfer . |
| 3,957,561 | 5/1976 | Skoultchi . |
| 4,081,308 | 3/1978 | Skoultchi . |
| 4,097,439 | 6/1978 | Darling . |
| 4,112,146 | 9/1978 | Lazear . |
| 4,380,613 | 4/1983 | Nativi . |
| 4,602,073 | 7/1986 | Skoultchi et al. . |
| 5,232,996 | 8/1993 | Shah et al. . |
| 5,318,998 | 6/1994 | Taguchi et al. . |
| 5,475,038 | 12/1995 | Skoultchi . |

OTHER PUBLICATIONS

Document No. 94:175596–Culbertson et al. Org. Coat. Plast Chem. 40, 903–8, 1979–In–House Computer Abstract pp. 44,45.

Document No. 115:281561–Taguchi et al. JP89–271748 89–10–20–In–House Computer Abstract pp. 24–27.

Document No. 113:213494 Taguchi et al–JP02097585–900410 In–House Computer Abstract pp. 28–32.

Document No. 106:19672–Oguri et al JP61181881–860814 In House Computer Abstract pp. 33–34.

Document No. 105:192485–Skoultchi et al–USP4602073860722 In House Computer Abstract pp. 34–36.

Culbertson, et al; "Acryloyloxyalkyl Carbamates: Synthesis, Characterization and Some Potential Uses" pp. 903–908.

*Primary Examiner*—Joseph L. Schofer
*Assistant Examiner*—N. Sarafim
*Attorney, Agent, or Firm*—Ernest G. Szoke; Wayne C. Jaeschke; Martin G. Meder

[57] ABSTRACT

The invention pertains to a composition containing an activator system for free-radical polymerizations and a free-radical polymerizable compound of the general formula II:

$$[H_2C=CR^1-C(=O)-O-R^2-O-C(=O)-NH-Q-NH-C(=O)]_k[(-O-R^{4a}-O-C(=O)-NH-Q'-NH-C(=O)]_m-O-R^{4a}-O-] \quad (II)$$

wherein m is from 0 to 10;

$R^1$ is hydrogen or a methyl group;

$R^2$ is a linear or branched chain alkyl group containing from 2 to 6 carbon atoms or an alkylene oxide containing from 4 to 21 carbon atoms;

Q and Q' independently are aromatic, aliphatic or cycloaliphatic groups containing from 6 to 18 carbon atoms which are derived from the basic diisocyanate or diisocyanate mixtures; and $R^{4a}$ is derived from a polyesterdiol having a C:O ratio of >2.6, a C:H ratio of <10, and a molecular weight of from 1000 to 20,000.

The invention further pertains to a process for the preparation of such composition and the use thereof.

47 Claims, No Drawings

5,700,891

LOW-ODOR ADHESIVE COMPOSITION COMPRISING (METH) ACRYLATES CONTAINING URETHANE GROUPS

BACKGROUND OF THE INVENTION

1. Field of the Invention

The present invention pertains to a low-odor adhesive composition based on (meth)acrylates containing urethane groups and the use thereof.

The invention further pertains to a polyurethane (meth) acrylate based on special polyesterdiols which may also be components of the adhesive compositions according to the invention.

2. Discussion of the Related Art

Methyl methacrylate is the most widely used monomer in commercial, free-radical curing reactive adhesives. In spite of the good adhesive properties of these systems, their use is increasingly restricted for olfactory reasons. The liquid esters of acrylic or methacrylic acid with longer aromatic or aliphatic side chains also all have an intensive odor and/or poor adhesive properties.

Therefore, the development of low-odor adhesive compositions is of great interest which compositions must be liquid or paste-like at room temperature.

EP-A-0 542 219 describes polyurethane (meth)acrylates based on polyfunctional isocyanates and special diols containing at least 8 carbon atoms, in particular 2-ethyl-3-propyl-1,5-pentanediol and/or its derivatives, as well as the use thereof in combination with a free-radical initiator as a coating, additive in inks, sealant or adhesive. EP-A-0 542 219 further describes the combination of the polyurethane (meth) acrylates with other acrylates and methacrylates.

WO-A-86/01153 and U.S. Pat. No. 4,600,640 describe adhesives for connecting a thin glass plate with a thermoplastic substrate using a solvent-free UV-curable adhesive composition containing a (meth)acrylate monomer the ester group of which contains a urethane group. Further, there are described urethane (meth)acrylates of the general formula

and polyurethane (meth)acrylates of the general formula

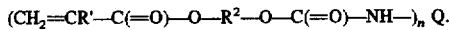

$R^6$ or $R^2$ is, for example, a methylene, ethylene or propylene group, R' is a methyl group or hydrogen, $R^7$ or Q is an aliphatic, cycloaliphatic or aromatic group. Particularly preferred as an adhesive are 2-acryloyloxyethyl-N-phenylcarbamate, 2-methacryloyloxypropyl-N-phenylcarbamate, 2-acryloyloxypropyl-N-phenylcarbamate, and acryloyloxyethyl-N-n-butylcarbamate.

DE-A-27 27 109 describes UV-curable compositions consisting of a mixture of a monoacrylate containing a urethane group and a polyurethane (meth)acrylate. The cured compositions exhibit excellent resistance to tropic humidity with respect to their toughness properties.

The polyurethane (meth)acrylates are reaction products of hydroxypropyl acrylate or methacrylate or hydroxyethyl acrylate with hexamethylene-, isophorone- or toluenediisocyanate, the monoacrylates are those of phenylisocyanate.

U.S. Pat. No. 4,439,600 describes a composition comprising (A) a reaction product of a polyesterdiol (from adipic acid and diethylene glycol) and an aliphatic or aromatic diisocyanate, and (B) a comonomer which is a reaction product of an isocyanate and hydroxyethyl methacrylate (HEMA), or 2-hydroxypropyl methacrylate, or 2-hydroxypropyl acrylate. The final products exhibit special wetting, swelling and adhesive properties as well as low volatility.

Proceeding from there, it has been the object of the present invention to provide low-odor adhesive compositions based on (meth)acrylates containing urethane groups which are liquid or paste-like and which when cured have a special resistance to humidity (hydrolysis resistance). The adhesive compositions should further have a long shelf-life and be suitable for one- and two-component adhesive systems and exhibit good adhesion on glass, wood, paper, metals and plastics as well as viscoplastifying properties.

OBJECTS OF THE INVENTION

This object has been achieved, according to the invention, by a composition containing an activator system for free-radical polymerizations and a free-radical polymerizable compound of the general formula II:

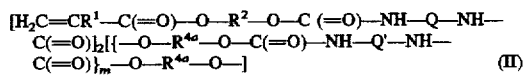

wherein m is from 0 to 10;

$R^1$ is hydrogen or a methyl group;

$R^2$ is a linear or branched chain alkyl group containing from 2 to 6 carbon atoms or an alkylene oxide containing from 4 to 21 carbon atoms;

Q and Q' independently are aromatic, aliphatic or cycloaliphatic groups containing from 6 to 18 carbon atoms which are derived from the basic diisocyanate or diisocyanate mixtures; and $R^{4a}$ is derived from a polyesterdiol having a C:O ratio of >2.6, a C:H ratio of <10, and a molecular weight of from 1000 to 20,000.

In addition, the composition may contain one or more of the free-radical polymerizable compounds (A) and/or (B) of the general formula:

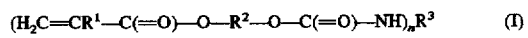

wherein $R^1$ is hydrogen or a methyl group;

$R^2$ is a linear or branched chain alkyl group containing from 2 to 6 carbon atoms or alkylene oxides containing from 4 to 21 carbon atoms; and n is 1, 2 or 3;

(A) wherein $R^3$, for N=1, is:

an aryl group containing from 6 to 18 carbon atoms;

a linear or branched chain alkyl group containing from 1 to 18 carbon atoms; or a cycloalkyl group containing from 3 to 12 carbon atoms;

(B) $R^3$, for N=2, is:

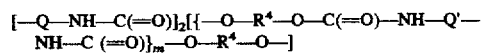

wherein m is from 0 to 10; and $R^4$ is a) a polycaprolactonediol residue;

b) a polytetrahydrofurfuryldiol residue; or $R^3$ for N=3, is:

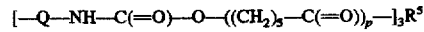

wherein $R^5$ is a triol residue of a linear or branched chain trihydric alcohol containing from 3 to 6 carbon atoms, and p is from 1 to 10; and Q and Q' independently are aromatic, aliphatic or cycloaliphatic groups containing from 6 to 18 carbon atoms which are derived from diisocyanates or diisocyanate mixtures;

and optionally one or more (meth)acrylate comonomers (C), wherein said composition contains 0–80% by weight of one or more of compounds (B) and 100–20% by weight of one or more of compounds (A), or 100–20% by weight of a mixture of one or more of compounds (A) and (C); or 2–80% by weight of one or more of compounds (B) and 98–20% by weight of one or more of compounds (C), respectively based on the total of (A)+(B)+(C).

DETAILED DESCRIPTION OF THE INVENTION

The compounds of formula (I) can be prepared according to per se known prior art methods by reacting an acrylate ($R^1$=H) or methacrylate ($R^1$=$CH_3$) containing hydroxy groups in the ester group with compounds containing isocyanate groups to form urethane groups.

The acrylates or methacrylates according to the invention are hydroxyalkyl acrylates or methacrylates wherein the alkyl groups can be linear or branched chain and contain from 2 to 6 carbon atoms. According to the invention, the esters of acrylic acid and methacrylic acid with polyethylene glycol and/or polypropylene glycol may also be used. Such acrylates or methacrylates contain from 4 to 21 carbon atoms in the ester group, corresponding to from 2 to 10 ethylene oxide units and from 1 to 7 propylene oxide units. The preparation of such esters is known to one skilled in the art.

Component(A)

Urethane (meth)acrylates of formula (I) for N=1 are known and can be obtained according to known methods from the underlying isocyanates by reaction with the corresponding (meth)acrylates containing hydroxy groups and having the general formula:

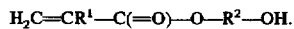

$H_2C$=$CR^1$—C(=O)—O—$R^2$—OH.

Such methods are described in WO-A-86/01153 or U.S. Pat. No. 4,439,600.

Suitable acrylates or methacrylates are those for which $R^2$ is an ethylene, propylene, isopropylene, n-butylene, isobutylene group or contains 4–7 ethylene oxide or propylene oxide units.

For the reaction of the isocyanates with the acrylates or methacrylates bearing hydroxy groups, there are preferred, however, hydroxyethyl acrylate, hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate, 6-hydroxyhexyl methacrylate, polyethylene glycol acrylate, polyethylene glycol methacrylate, polypropylene glycol acrylate, and polypropylene glycol methacrylate.

The linear or branched chain alkyl groups containing from 1 to 8 carbon atoms for $R^3$ are, in particular, methyl, ethyl, propyl, isopropyl, n-butyl, isobutyl, tert.-butyl, pentyl, isopentyl, neopentyl or hexyl groups.

The cycloalkyl groups containing from 3 to 12 carbon atoms are preferably selected from cyclopropyl, cyclobutyl, cyclopentyl, cyclohexyl and cycloheptyl groups.

As aromatic groups containing from 6 to 18 carbon atoms, there may be mentioned, in particular, phenyl, 2-toluenyl, 4-toluenyl and xylenyl groups which are introduced by reaction of the (meth)acrylates containing hydroxy groups with the corresponding isocyanates.

Component (B)

If N=2, the compounds of the general formula (I) are products of the reaction of the above-mentioned acrylates or methacrylates containing hydroxy groups with isocyanates which can be obtained by reaction of appropriate diols with diisocyanates. The diols are a) polycaprolactonediols, b) polytetrahydrofurfuryldiols, and c) special polyesterdiols. The molar ratio in the reaction of the diols with the diisocyanates can vary within the range of from 1:2 to 1:1.1.

a) Polycaprolactonediols can be obtained according to per se known methods by ring-opening polymerization of caprolactone with appropriate diols wherein the ratio of caprolactone to diol is from 1 to 20, i.e. 2 to 40 moles of caprolactone is employed per mole of diol. The molecular weight of the polycaprolactonediols is from 200 to 4000.

As the diols, there can be used, in particular, linear or branched chain dihydric alcohols containing from 2 to 6 carbon atoms which are selected from ethylene glycol, 1,2-propanediol, 1,3-propanediol, 1,2-, 1,3- or 1,4-butanediol, 1,5-pentanediol, 2-methyl-1,4-butanediol, 2,2-dimethyl-1,3-propanediol, 1,2- or 1,6-hexanediol, 1,10-decanediol.

Subsequently, the products of the reaction between the diol and the caprolactone are reacted with aromatic, aliphatic or cyclic diisocyanates according to methods known to those skilled in the art. Suitable diisocyanates from which Q and independently also Q' are derived are selected from 2,4-toluenediisocyanate, 2,6-toluenediisocyanate, 4,4'-diphenylmethanediisocyanate (MDI), 4,4'-dicyclohexyldiisocyanate, meta- and para-tetramethylxylenediisocyanate, 3-isocyanatomethyl-3,5,5-trimethylcyclohexylisocyanate (isophorone diisocyanate), hexamethylenediisocyanate, 1,5-naphthylenediisocyanate, dianisidinediisocyanate, bis(2isocyanatoethyl)bicyclo[2.2.1]hept-5-ene-2,3-dicarboxylate, 2,2,4- and 2,4,4-trimethylenehexamethylenediisocyanate, and mixtures thereof.

Subsequently, the reaction product from the diol, the caprolactone and the diisocyanate is reacted with the acrylate or methacrylate containing hydroxy groups according to per se known methods to give the polyurethane (meth)acrylate.

b) Build-up of the compounds (B) derived from polytetrahydrofurfuryldiol is performed, in principle, according to the same scheme as described under a). First, polytetrahydrofurfuryldiol is reacted with one of the diisocyanates mentioned above under a), and the reaction product is reacted with the acrylates or methacrylates containing hydroxy groups already mentioned under a) to give the polyurethane (meth)acrylate. With respect to the method for reacting diols with diisocyanates, reference is made to the respective technical literature known to those skilled in the art. The molecular weight of the products is between 200 and 4500.

c) By employing the above-mentioned polyurethane (meth)acrylates of general formula II based on special polyesterdiols, particularly good properties, especially with respect to hydrophobization, are achieved. These polyurethane (meth)acrylates have a particular elastifying effect.

These polyurethane (meth)acrylates are compounds of the general formula II:

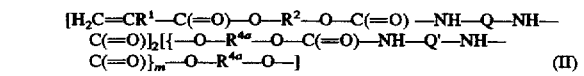

[$H_2C$=$CR^1$—C(=O)—O—$R^2$—O—C(=O)—NH—Q—NH—C(=O)]$_b$[—O—$R^{4a}$—O—C(=O)—NH—Q'—NH—C(=O)]$_m$—O—$R^{4a}$—O—]   (II)

wherein $R^1$, $R^2$, Q, Q' and m are the same as defined above.

$R^4$ represents polyesterdiol residues derived from polyesterdiols which are characterized by a C:O ratio of >2.6, preferably >3.0, and a C:H ratio of <10. Further, these polyesterdiols are characterized by a molecular weight of from 1000 to 20,000, in particular from 1000 to 10,000.

The preparation of these special polyesterdiols is performed by reacting long-chain diols, in particular dimerdiol (hydrogenated dimer fatty acid), with shorter-chain dicarboxylic acids containing from 4 to 8 carbon atoms or their anhydrides, in particular succinic acid or succinic anhydride. The polyesterdiols can also be prepared by reacting shorter-chain diols containing from 4 to 8 carbon atoms, in particular 1,6-hexanediol, with long-chain fatty acids, in particular dimer fatty acid mixture of dimerized fatty acids of acyclic and cyclic dicarboxylic acids containing an average of 36 carbon atoms. However, there can also be used mixtures of long-chain diols with shorter-chain diols, such as, in particular, mixtures of hexane diol and polyethylene glycol, or dimerdiol and diethylene glycol.

Generally, particularly preferred diols are linear or branched chain $C_2$ to $C_{44}$ alkyldiols, such as ethylene glycol, 1,2- or 1,3-propylene glycol, 1,2-, 1,3- or 1,4-butanediol, neopentyl glycol, 1,2- or 1,6-hexanediol, 1,10-decanediol, 1,12-octadecanediol. However, cyclic $C_6$ to $C_{44}$ alkyldiols may also be used.

Diols containing ether groups are further preferred, such as, for example, di-, tri- or tetraethylene or -propylene glycol or their oligomeric homologues.

Generally, particularly preferred dicarboxylic acids are linear or branched chain $C_2$ to $C_{44}$ alkyldicarboxylic acids, such as oxalic acid, malonic acid, succinic acid, glutaric acid, adipic acid, pimelic acid, suberic acid, azelaic acid, nonanedicarboxylic acid, decanedicarboxylic acid, undecanedicarboxylic acid, or technical mixtures thereof. In the reaction with the diols, there may also be employed unsaturated $C_4$ to $C_{44}$ dicarboxylic acids, such as maleic acid, fumaric acid, itaconic acid, or aconitic acid.

The esterification can be performed according to per se known methods in the presence of a catalyst in an appropriate solvent at an elevated temperature with azeotropic removal of the reaction water. A preferred catalyst is stannous octoate, and a preferred solvent is xylene.

The polyesterdiols thus obtained are then reacted with one of the diisocyanates mentioned above under a) and subsequently reacted with the acrylates or methacrylates containing hydroxy groups already mentioned under a) to give the polyurethane (meth)acrylate. One or more of these polyurethane (meth)acrylates based on the special polyesterdiols can be employed in admixture with activators and optionally other conventional additives as an adhesive composition.

If N=3, the compounds of the above-mentioned general formula (I) are products of the reaction of the above-mentioned acrylates or methacrylates containing hydroxy groups with isocyanates which can be obtained by reaction of appropriate linear or branched chain trihydric alcohols (triols) containing from 3 to 6 carbon atoms with caprolactone and subsequent reaction with diisocyanates.

Polycaprolactonetriols can be obtained according to per se known methods by ring-opening polymerization of caprolactone with appropriate triols wherein the ratio of caprolactone to triol is from 1 to 10, i.e. 3 to 30 moles of caprolactone is reacted per one mole of triol.

As the triols, there can be used, in particular, those selected from glycerol, 1,2,4-butanetriol, trimethylolpropane (2-hydroxymethyl-2-ethyl-1,3-propanediol), and trimethylolethane (2-methyl-2-hydroxymethyl-1,3-propanediol).

Subsequently, the products of the reaction of the triol and the caprolactone are reacted with the diisocyanates mentioned under a) according to methods known to those skilled in the art. Thereafter, the reaction product from the triol, the caprolactone and the diisocyanate is reacted with the acrylate or methacrylate containing hydroxy groups according to per se known methods to give the polyurethane (meth) acrylate.

Component (C)

The adhesive composition may further contain one or more acrylate or methacrylate comonomers (C). These monomers (C) are selected from allyl acrylate, allyl methacrylate, methyl acrylate, methyl methacrylate, 2-hydroxyethyl acrylate, 2-hydroxyethyl methacrylate, 2- or 3-hydroxypropyl acrylate, 2- or 3-hydroxypropyl methacrylate, 6-hydroxyhexyl acrylate, 6-hydroxyhexyl methacrylate, benzyl methacrylate, phenylethyl methacrylate, 2-phenoxyethyl methacrylate, morpholinoethyl methacrylate, glycidyl methacrylate, piperidylacrylamide, neopentyl methacrylate, cyclohexyl methacrylate, tert.-butyl methacrylate, and tetrahydrofurfuryl methacrylate, or mixtures thereof.

Preferably, the composition according to the invention contains from 10 to 70% by weight of one or more of compounds (B) and from 90 to 30% by weight of one or more of compounds (A) and/or (C), based on the total of (A)+(B)+(C).

The adhesive compositions according to the invention may be employed as free-radical polymerizable one-component or multi-component systems, in particular two-component systems. In either case, however, an initiator or activator system is used which initiates the polymerization at olefinically unsaturated systems. Such activators have the ability to be activatable by contact with ambient air, and in preferred embodiments such activation is to occur already at room temperature. Such activator systems generally consist of an initiator component and a promoter component.

One-component adhesive systems are to have a long shelf-life, to be plastic in its application form, in particular paste-like to liquid, and have a sufficient pot-life to be worked, but then cure in a dimensionally stable manner by simple action of ambient air. The one-component adhesive systems must be kept protected from contact with air until used.

However, the adhesive compositions may also be designed as multi-component and in particular as two-component systems. Then, in the practical use of the system, the components are mixed. The pot-life of the system can be controlled by appropriately selecting and matching of the main components of the activator system, so that in this case too, triggering of the initiation reaction and thus ultimately curing of the system is possible under ambient conditions in air. In one embodiment of the invention, the compositions consisting of an activator system and polymerizable components are present as a two-component system which is unreactive even when air is admitted. In this case, it is particularly preferred to separate the main components of the activator systems employed. Then, both components generally may contain an ethylenically unsaturated reactive composition. In order to work such adhesive, only mixing of these two separately kept components, shaping within the pot-life of the system, and admission of ambient air are required.

With respect to the hardener (initiator), the activator systems which may be used according to the invention can be classified into peroxide systems and hydrazone systems.

Peroxide or hydroperoxide initiated curing of unsaturated, polymerizable systems requires selected initiator or activator systems especially in the case that triggering of the reaction is to be performed at lower temperatures, for instance, room temperature or but slightly elevated temperatures. It is known, for example, that selected tertiary amine compounds with partial aromatic substitution at the nitrogen atom have such activator or accelerator functions. Known activators for polymerization initiation, for example, by means of dibenzoyl peroxide, are dimethylaniline and dimethyl-p-toluidine, in particular.

Peroxides which may be employed within the scope of the invention are, in particular, diaryl peroxides, hydroperoxides, peracids and peresters, such as, preferably, di-tert.-butyl peroxide, dibenzoyl peroxide, cumene hydroperoxide, 2,4-dichlorobenzoyl peroxide, tert.-butyl hydroperoxide, peroxyacetic acid, peroxybenzoic acid, azoisobutyronitrile, or tert.-butyl peroxyacetate.

The second component of the activator of the system is selected from tertiary amines and, in particular, dimethylaniline and dimethyl-p-toluidine which are particularly preferred accelerators, in particular, for polymerization initiation using dibenzoyl peroxide.

As accelerators in combination with peroxides, heavy metal salts or their solutions may also be employed, of which, in addition to Co salts, copper(II) salts (e.g. copper (II) naphthenate), in particular, may be mentioned.

Within the scope of the invention, hydrazones may also be used as the initiator or major component in activator systems for the curing of the unsaturated compounds by means of ambient air. These hydrazone compounds are preferably employed together with metallic compounds for acceleration which are at least partially soluble in the system.

The hydrazone components which are preferably employed according to the invention respond to the following general formula III:

$$R^5R^6C=N-NH-R^7 \quad (III)$$

In this embodiment, the residues $R^5$, $R^6$ and $R^7$ in this general formula (III) have the following meanings:

- $R^5$ is a linear, branched chain or cyclic alkyl residue which may be substituted or an aryl residue which may be substituted.
- $R^6$ may be the same as $R^5$ or different and is hydrogen, a linear, branched chain or cyclic alkyl residue which may be substituted or an aryl residue which may be substituted.
- In a special embodiment, residues $R^5$ and $R^6$ may also, together with the adjacent carbon atom to which they are bound, form a cycloaliphatic residue which may be substituted.
- Residue $R^7$ is again a linear, branched chain or cyclic alkyl residue which may be substituted or an aryl residue which may be substituted.

At least any two of residues $R^5$, $R^6$ and $R^7$ or all may be the same, but they may also be structurally different from each other. As the alkyl residues, there are considered, in particular, linear and/or branched chain alkyl residues containing up to 40 carbon atoms, preferably up to about 20 carbon atoms. The minimum number of carbon atoms of cyclic residues is determined by the stability of the corresponding ring system. A preferred lower limit is 5 and in particular 6 carbon atoms. Residues $R^5$, $R^6$ and $R^7$ may be unsubstituted or substituted. It is to be considered that the reactivity of the activator system may be influenced to some extent by the kind of substitution of these residues and in particular of residue $R^7$. If residue $R^7$ is an aromatic system, for example, in particular a phenyl residue, then an acceleration of the reaction may be achieved by appropriate substitution of this phenyl residue, i.e. by providing per se known electron-releasing substituents at this phenyl residue in $R^7$.

Electron-releasing and thus reaction-accelerating substituents are, for example, alkyl, alkoxy and/or halogen substituents at the phenyl residue in $R^7$; inversely, strongly electron-withdrawing substituents, such as the -$NO_2$ group, have a retarding effect on the reaction course. With respect to such electron-releasing and electron-withdrawing effects by substitution and the structure of the respective substituents, an extensive general technical knowledge exists to which reference is made herein. For more details, in particular with respect to the preparation of such hydrazones, see WO-A-91/10687.

Further, hydrazones of the following general formula:

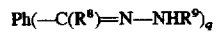

$$Ph(-C(R^8)=N-NHR^9)_q$$

may be employed wherein q is a number from 1 to 3;

$R^8$ is H or an alkyl group containing up to 40 carbon atoms; and $R^9$ is independent of the other substituents and is H or an aromatic or aliphatic group containing up to 40 carbon atoms.

These hydrazone compounds are mono-, di- or trifunctional. Residues $R^8$ and $R^9$ are preferably linear and/or cyclic alkyl groups containing up to 40 carbon atoms, in particular from 3 to 8 carbon atoms. At least one $R^9$ residue per molecule should be such an alkyl group. Residues $R^8$ and $R^9$ may be unsubstituted or substituted. It is to be considered that the reactivity of the activator system may be influenced to some extent by the kind of substitution of these residues, in particular of residue $R^9$. If an aromatic system is present, for example, in particular a phenyl residue, then an acceleration of the reaction may be achieved by appropriate substitution of this phenyl residue, i.e. by providing per se known electron-releasing substituents at this phenyl residue in $R^9$.

Electron-releasing and thus reaction-accelerating substituents are, for example, alkyl, alkoxy and/or halogen substituents at the phenyl residue in $R^9$. Inversely, strongly electron-withdrawing substituents, such as the -$NO_2$ group, have a retarding effect on the reaction course. With respect to such electron-releasing and electron-withdrawing effects by substitution and the structure of the respective substituents, an extensive general technical knowledge exists to which reference is made herein.

Residue $R^8$ of the general formula may also serve to influence the reaction rate by selecting its constitution and kind of substitution, if any.

The extraordinary wide variety of the particular nature of residues $R^8$ and $R^9$ in the compounds of the general formula can be seen from the U.S. Pat. No. 4,010,152, namely the formula representations in the columns 6 to 14. Here, the hydrazone compounds are represented already in the form of their hydroperoxides which are also formed in situ according to the invention in the course of the reaction when atmospheric oxygen is admitted. The extensive statements of this latter document with respect to the particular nature of the hydrazone compounds and the hydroperoxides which are produced therefrom in situ also apply to the teaching of the present invention in connection with the definition of the compounds of the general formula. For convenience, reference is made to this detailed printed representation together with the specification of the invention. Of course, the benzene ring may also contain other substituents unless interfering with the initiator function.

Concrete examples include acetophenone methylhydrazone (q=1, $R^8=R^9=CH_3$), acetophenone t-butylhydrazone (q=1, $R^8=CH_3$, $R^9=C(CH_3)_3$).

For more details, in particular with respect to the preparation of such hydrazones, see WO-A-93/01218.

As the metallic compounds which are at least partially soluble in the system, there are employed primarily compounds of metals which can exist in several valence states. Selected representatives of transition metals may be particularly active. The metal may be selected, inter alia, to determine the rate of polymerization initiation. Components which are highly active at room temperature are derived, for instance, from copper, cobalt, vanadium and/or manganese. Iron compounds, however, are particularly important, being fair reaction accelerators.

For working at room temperature which is especially advantageous in many fields of application, iron, cobalt and/or manganese compounds are particularly useful, optionally in admixture with other metallic components, such as lead, cerium, calcium, barium, zinc and/or zirconium compounds. Reference will be made here to the relevant technical literature, for example, cf. the cited publication in "Ullmann Encyklopädie der technischen Chemie", 4th edition, volume 23 (1983), pages 421 to 424, and literature cited therein.

The metals concerned are employed in the form of such compounds that they are at least partially soluble in the total system. There are considered both soap-type metallic compounds and other types of bonding, in particular those with complex bonding to organic residues. In typical embodiments, there are used appropriate metal naphthenates or metal acetylacetonates. However, if inorganic salts are sufficiently soluble in the system, such inorganic systems may also be used. A typical example thereof is iron chloride which exhibits a significant accelerating action when employed in the system according to the invention.

It may be convenient to employ the metallic compounds respectively in a low valence state of the metal, i.e., for example, as cobalt(II) or manganese(II). In other instances, it may also be useful to employ a metallic compound with a higher valence state of the metal. Thus, for instance, iron may also be used in the form of ferric ($Fe^{3+}$) compounds.

Reductive agents having accelerating actions may also be included in the activator component, if desired. They are employed in conventional redox systems for polymerization initiation. Reference will be made to the relevant technical literature, for example, W. Kern, Makromol. Chem. 1, 249 (1947), and C. Srna, Angew. makromol. Chem. 9, 165 (1969), as well as the general technical knowledge as described, for example, in Houben-Weyl, "Methoden der organischen Chemie", volume 14/1, 263 to 297.

The class of alpha-hydroxyketones, represented, for example, by butyroin, benzoin or acetoin, has been found to be particularly active. It is important that although this class of substances can serve an essential reaction-accelerating function in the activator systems employed according to the invention, their use is not indispensable.

Initiators or activator systems consisting of the main components described herein, hydrazone compound, metallic dry substance which is at least partially soluble, and/or optionally used accelerator, may be employed instead of the peroxide-type initiator systems.

In the compositions of the invention, the peroxide and hydrazone activator mixtures preferably make up not more than about 15% by weight, in particular not more than about 10% by weight, based on the total system. Depending on the activity of the components employed, the weight of the activator mixture can be highly reduced, for instance, to the order of about 0.1% by weight or at least to about 0.5% by weight. It may be particularly useful for the amount of the activator system to be at least about 1% by weight, preferably up to about 8% by weight.

The three above-mentioned components of the hydrazone activator system may preferably be used in the following proportions:

hydrazone compounds: at least about 0.1% by weight, suitably from 0.5 to 7.5% by weight, preferably from 1 to 4% by weight;

metal of soluble metallic compound: from 0 to a few % by weight, suitably about 50 ppm to 1% by weight, preferably more than 100 ppm, e.g. 1000 to 5000 ppm;

reductive agent: from 0 to 5% by weight, preferably from 1 to 3% by weight, respectively based on the total mixture.

In order to control the course of the reaction and/or the pot-life, inhibitors and/or stabilizers may be included in a per se known way to prevent premature triggering of the free-radical reaction. The amount thereof is determined by the intended purpose. It can be established easily in each instance by technical considerations and/or preliminary experiments. The stabilizers employed will usually not exceed a few percent, e.g. about 2 to 5% by weight, of the total mixture and are generally below 1% by weight, based on the total mixture.

The invention respectively allows the formulation of optimized adhesive compositions. Within the scope of the invention, soluble and/or insoluble fillers, elasticators, thickeners, thixotropic agents, pigments, adhesion promoters, stabilizers and the like may be included without jeopardizing the function of the compositions according to the invention. Of course, it is required to ensure by appropriately selecting the additives and fillers that interference with the interaction of the activator components is excluded. This is subject to general chemical knowledge. For inhibiting the systems according to the invention, several per se known mechanisms are available. The following basic types will be mentioned:

Stabilization towards $O_2$, addition of antioxidants; and Stabilization towards free radicals, addition of free-radical inhibitors.

Typical stabilizer components included in the general chemical knowledge will be listed in the following. In parentheses after each particular compound, there is stated to which mechanism the stabilizer respectively belongs:

Pyrogallol (1), $O_2$-inhibited acrylates (1), hydroquinone (1,2), hydroquinone monomethyl ether (1,2), butylhydroxytoluene (2), and phenothiazine (2). Compounds of the triphenylphosphine type as well as NaI and $I_2$ may be particularly important in stabilizing the system towards undesirable premature reaction.

The composition according to the invention can be used as an aerobically curing adhesive system, as a brushable agent for surface coating with polymerizable, especially solvent-free, paints in terms of brushable air-drying paint systems, for the preparation of molded parts with reaction initiation by the action of ambient air, for example, based on styrene/unsaturated polyester resins, and as a sealant and in printing inks.

For the preparation of the adhesive compositions according to the invention, the free-radical polymerizable compound or compounds are homogenized in a stirring apparatus together with the activator system and the optional further additives in desired proportions. In the case of one-component adhesive compositions, care is to be taken that homogenization is performed with exclusion of atmospheric oxygen. To achieve this, it has been found convenient to evacuate and then aerate with nitrogen the stirring apparatus with the polymerizable compounds prior to the addition of the last activator component (with combinations of hardener/accelerator). This procedure may be repeated several times, if desired.

For preparing the two-component systems, such precautions are not necessary. In this case, the activator system consisting of hardener and accelerator is mixed only when the adhesive composition is actually being used, so that one component of the activator system alone or in admixture with the polymerizable compound is given to the other portion of the polymerizable compound which contains the second component of the activator system.

The compositions according to the invention are low-odor in nature, elastifying, liquid or paste-like, and when cured exhibit good resistance to humidity. Further, they can be formulated without any problems as one- or two-component systems and show excellent adhesion on glass, ceramics, metals, plastics and cellulose-containing materials, such as wood or paper. This is demonstrated, in particular, by the tensile shear strengths determined on iron sheets according to DIN 53281 (preparation of the test specimens) and DIN 52283 (determination of tensile shear strength). The following examples will illustrate the present invention, however, without in any way limiting it.

EXAMPLES

I) Urethane (meth)acrylates and preparation thereof

Example 1

(Preparation of the monomer)

1.05 moles of hydroxypropyl acrylate is stirred at 55° C. under $N_2$, and a total of 1 mole of phenylisocyanate is added thereto in portions. The addition is performed in such a way that the reaction temperature will not exceed 80° C. After completion of the addition, stirring is continued at 70° C. for 1 hour. Thereafter, free NCO is no longer detectable. The product has a viscosity of 1000 mPa.s.

It is stabilized with 100 ppm of hydroquinone monomethylether. Further, the following urethane (meth)acrylates were prepared from the following starting compounds:

TABLE 1

| Isocyanate | (Meth)acrylate | mp [°C.] |
|---|---|---|
| a) phenylisocyanate | hydroxyethyl acrylate | 63–65 |
| b) phenylisocyanate | hydroxypropyl acrylate | viscous liquid |
| c) phenylisocyanate | hydroxyethyl methacrylate | 55 |
| d) phenylisocyanate | hydroxypropyl methacrylate | 62–64 |
| e) cyclohexylisocyanate | hydroxyethyl methacrylate | 56 |

Example 2

(use as an adhesive

Two-component adhesive compositions with dibenzoyl peroxide and tertiary amine as initiators and methacryloyloxyethyl phosphate as an adhesion promoter give tensile shear strengths around 15 N/mm² on blasted iron sheets. By addition of co-curing, elastifying additives (e.g. methacrylate terminated polyether polyurethanes), the strengths may be increased to above 20 N/mm². A comparable composition based on MMA exhibits tensile shear strengths of 26 N/mm².

A two-component adhesive has been prepared:

| Component a: | monomer of example 1 | 50 parts |
|---|---|---|
|  | dibenzoyl peroxide | 0.42 parts |
| Component b: | monomer of example 1 | 50 parts |
|  | N,N-dimethyltoluidine | 0.21 parts |

Components a and b are mixed in a ratio of 1:1, and 1 part of methacryloyloxyethyl phosphate (adhesion promoter) is added thereto. The tensile shear strengths on sandblasted iron sheets (DIN 52283) were measured after 1 day (table 2).

With acetophenone tert.-butylhydrazone (APtBH) as a hydrazone, iron bondings (5 minutes of open time) having tensile shear strengths of 5–10 N/mm² may be prepared using N-phenylmethacryloylethyl carbamate and N-phenylacryloylethyl carbamate.

Example 3

Instead of monomer 1 in the two-component formulation of example 2, a mixture of monomer 1 and the reaction product of hydroxyethyl acrylate and phenylisocyanate (table 1,a)) was employed.

Example 4

Instead of monomer 1 in the two-component formulation of example 2, a mixture of monomer 1 and a methacrylate terminated poly-THF 2000 [composition: HEMA—TDI—Poly-THF 2000—TDI—HEMA (HEMA=hydroxyethyl methacrylate)]in a ratio of 8:2 was employed.

TABLE 2

| Example | Tensile shear strength iron/iron (N/mm²) |
|---|---|
| 2 | 15.2 |
| 3 | 16.1 |
| 4 | 20.2 |

II) Preparation of the polyester diols

Example 5

446.6 g of dimerdiol (hydrogenated dimer fatty acid) and 60 g of succinic anhydride are heated at 185° C. together with 50 g of xylene and 0.5 g of Sn(II) octoate on a water separator for 7 hours. Subsequently, the xylene is distilled off in a water-jet vacuum while the bath temperature is increased up to 210° C. The product thus obtained has an acid number (AN) of 0.9 and an OH number (OHN) of 47, corresponding to an average molecular weight of 2400.

Composition: C 78.53%; H 12.08%; O 9.39%; C:O=8.36; C:H=6.5

Example 6

446.6 g of dimerdiol, 70 g of succinic anhydride and 0.5 g of Sn(II) octoate are reacted in analogy to example 5. The resulting polyesterdiol has an AN of 1.7, an OHN of 25, and an average molecular weight of 4500.

Composition: C 78.19%; H 11.92%; O 9.89%; C:O=7.9; C:H=6.56

Example 7

97.5 g of hexanediol and 400.7 g of dimer fatty acid VD 288 are heated at 195° C. together with 100 g of xylene and 0.5 g of Sn(II) octoate on a water separator for 7 hours.

Subsequently, the xylene is distilled off. The resulting polyesterdiol has an AN of 0.1, an OHN of 19.1, and an average molecular weight of 5900.

Composition: C 77.62%; H 12.15%; O 10.23%; C:O=7.6; C:H=6.4

Example 8

97.5 g of hexanediol-1,6 and 343.5 g of dimer fatty acid are reacted in analogy to example 7. The polyesterdiol has an AN of 0.3, an OHN of 55, and an average molecular weight of 2000.

Composition: C 76.99%; H 12.14%; O 10.88%; C:O=7.08; C:H=6.34

Example 9

118.2 g of hexanediol, 626 g of polyethylene glycol (MW 600) and 858 g of dimer fatty acid are reacted in analogy to examples 7 and 8. The polyesterdiol has an AN of 1.2, an OHN of 37, and an average molecular weight of 3000.

Composition: C 68.5%; H 10.78%; O 20.73%; C:O=3.3; C:H=6.35

Example 10

446.6 g of dimerdiol, 84.9 g of diethylene glycol, 140.1 g of succinic anhydride and 0.7 g of Sn(II) octoate are reacted in analogy to examples 5 and 6. The resulting polyesterdiol has an AN of 2.0, an OHN of 31, and an average molecular weight of 3200.

Composition: C 71.94%; H 10.73%; O 17.33%; C:O=4.15; C:H=6.7

Example 11

718 g (1.33 mol) of dimerdiol, 570 g (1 mol) of dimer fatty acid and 0.6 g of Sn(II) octoate are heated to 150° C. Within 6 hours, the temperature is increased to 225° C. while a vacuum of 1.333 kPa (100 Torr) is applied from the 2nd hour on. After 6 hours, heating is performed at 240° C. for another 8 hours in an oil pump vacuum. After the reaction is completed, the polyesterdiol obtained has an acid number of 0.5, an OH number of 31, and an average molecular weight of 36,000.

Composition: C 81.2%; H 12.77%; O 6%; C:O=13.5; C:H=6.36

III) Preparation of the polyurethane methacrylates (PUMA)
General preparation protocol:

0.2 moles of a polyester diol is heated to 45° C. In the course of 5 min, 0.4 moles of Desmodur T 100 (2,4-toluenediisocyanate (TDI), commercial product of Bayer, Leverkusen), is added while the temperature is kept at maximally 55° C. Heating is continued for another 15 min at 55°–60° C. until the NCO content of the mixture has reached 50% of its initial value. Then, 0.2 moles of hydroxypropyl methacrylate (HPMA) is added and the mixture is heated at 80° C. until the NCO content has decreased to below 0.1%. An 80% solution of the PUMA in excess HPMA results.

Comparative example 12

According to the above general preparation protocol, a polyurethane methacrylate (PUMA) is synthesized with CAPA 220 (polycaprolactone, commercial product of Interox, C 62.4%; H 8.86%; O 28.72%; C:O=2.17; C:H=7.05).

IV) Adhesive formulations a) General preparation protocols for two-component adhesive formulations:

Type I

Component A: 37.5 weight parts of methacrylate monomer, 62.5 weight parts of PUMA (prepared according to the respective examples), 0.5 weight parts of JPA 514 (adhesion promoter: methacryloyloxyethyl phosphate, commercial product of Johoku Chem.), and 1 weight part of N,N-dihydroxyethyl-p-toluidine are homogenized by vigorous stirring.

Component B: Benzoyl peroxide, 20% on gypsum.

The adhesive is made to cure by mixing of 4 weight parts of component A and 1 weight part of component B.

Type II

Component A: 37.5 weight parts of methacrylate monomer, 62.5 weight parts of PUMA, and 3% of Trigonox K80 (cumene hydroperoxide, 80% solution in cumene, commercial product of Akzo) are homogenized by vigorous stirring.

Component B: 37.5 weight parts of HPMA, 62.5 weight parts of PUMA, 1 weight part of JPA, and 1 weight part of 8% copper(II) naphthenate solution (Soligen-Kupfer, commercial product of Borchers) are homogenized by stirring.

The adhesive is made to cure by mixing equal volumes of components A and B.

b) General preparation protocol for one-component reactive adhesives:

Type III 37.5 weight parts of methacrylate monomer, 62.5 weight parts of PUMA, 0.5 weight parts of JPA 514, 1 weight part of iron(III) acetylacetonate, and 0.1 weight parts of sodium iodide are homogenized in a stirring apparatus, evacuated and then aerated with nitrogen. In order to completely exclude oxygen, this procedure is repeated twice. Then, 3 weight parts of acetophenone tert.-butylhydrazone are added in a nitrogen countercurrent, and the mixture is again evacuated with stirring and aerated with nitrogen.

For curing and bonding, the adhesive is applied to the parts to be joined (2.4 g/m$^2$), exposed to ambient air for 5 minutes, and then the parts to be bonded were joined and fixed.

Type IV

Procedure and components similar to type III, except that acetophenone methylhydrazone is used instead of the corresponding tert.-butyl hydrazone.

The tensile shear strengths are determined according to DIN 53283 using single-shear lap-joined samples (250 mm$^2$). Resistance to humidity is determined by measuring the tensile shear strength after storing the cured bonded joint in a climate of 40° C. and 99% relative humidity for 10 days. The peel resistances were determined according to DIN 53282 using angular sheet metals after storage for 72 h at room temperature (RT).

The results of tensile shear testing with and without climatic storing and of the T-peel tests are given in the following table 3

TABLE 3

| PUMA with polyester-diol according to example No. | type of adhesive | methacrylate monomer | tensile shear strength after 24 h at RT | [N/mm²] after climatic test | T-peel resistance [N/mm] |
|---|---|---|---|---|---|
| 5 | I | HPMA | 15.3 | 12.9 | 3.5 |
| 6 | I | MMA | 17.5 | 14.9 | 5.2 |
| 6 | I | 2-phenoxyethyl methacrylate | 14.8 | 11.9 | 5.1 |
| 7 | I | 2-phenoxyethyl methacrylate | 12.2 | 9.8 | 4.7 |
| 8 | I | HPMA | 16.3 | 14.6 | 6.3 |
| 8 | III | " | 14.3 | 11.8 | 2.9 |
| 9 | I | " | 13.2 | 12.1 | 5.6 |
| 10 | I | " | 19.5 | 17.2 | 5.7 |
| 10 | II | " | 17.8 | 15.4 | 5.2 |
| 10 | III | HPMA | 21.0 | 18.9 | 3.1 |
| 10 | IV | " | 13.4 | 9.8 | 3.0 |
| 11 comp. 12 | I | THFMA | 19.1 | 11.6 | 1.8 |
|  | I | HPMA | 21.0 | 9.3 | 2.4 |
|  | III | " | 20.2 | 8.4 | 1.3 |
|  | IV | " | 21.7 | 12.4 | 2.1 |

V) Preparation of an adhesive composition from a ol urethane methacrylate mixture based on polycaprolactonediol and -triol Educts:

540 g (1 mol) of polycaprolactonetriol, MW 540 (CAPA 305, commercial product of Solvay)

1376 g (0.65 mol) of polycaprolactonediol, MW 2000 (CAPA 220, commercial product of Solvay)

748 g (4.3 mol) of 2,4-toluenediisocyanate (Desmodur T 100, commercial product of Bayer)

1430 g (9.9 mol) of hydroxypropyl methacrylate (HPMA 97, commercial product of Röhm)

1.23 g of hydroquinone monomethyl ether (commercial product of Fluka)

Preparation protocol:

The polyols are charged into a stirring apparatus and heated to 50° C. The toluene diisocyanate (TDI) is added dropwise in the course of 30 min while the temperature of the mixture does not exceed 55° C. After completion of the addition, heating is performed for 45 min at 60° C. until the NCO content has reached a value of 6.8%. The hydroquinone monomethyl ether and the HPMA are added and the mixture heated at 80° C. until the NCO content has become <0.1%. The reaction product is an 80% solution of the polyurethane (meth)acrylate in (excess) HPMA.

VI. Composition based on polyurethane (meth)acrylate in admixture with another acrylate or methacrylate comonomer Basic formulation:

Monomer

20% of PUMA (from Poly-THF, MDI, HEMA)

3% of acetone phenylhydrazone (APH)

1.3% of Fe acetylacetonate

2% of butyroin 0.5% of HEMA phosphate triphenylphosphine (TPP; 5 mole %, based on APH)

The monomers listed in the following tables were included in this basic formulation, and iron bondings were performed with the adhesives obtained.

TABLE 4

| Monomer | Tensile shear strength (in N/mm²) of Fe/Fe bonding after open times of | | |
|---|---|---|---|
|  | 1 min | 5 min | 20 min |
| benzyl MA | 7.3 | 9.1 | 5.3 |
| phenylethyl MA | 10.7 | 12.6 | 12.1 |
| phenoxyethyl MA | 8.2 | 11.8 | 10.5 |
| piperidyl acrylamide | 3.1 | 4.0 | 14.4 |
| morpholinoethyl MA | 8.2 | 11.3 | 7.8 |
| glycidyl MA | 3.8 |  | 21.3 |
| hydroxypropyl acrylate (HPA)/phenylisocyanate | 0.5 |  | 3.4 |

(MA = methacrylate)

TABLE 5

| monomer | PUMA added | tensile shear strengths of Fe/Fe bondings (N/mm²) | | | | |
|---|---|---|---|---|---|---|
|  |  | initial values | | storage at 50° C. | | measured |
|  |  | 1 min | 5 min | 1 min | 5 min | after |
| neopentyl MA | — | 6 | 4.6 | 4 | 3–8 | 5 months |
| " | 15% | 20.3 | 11.5 |  | 16.5 | 3 months |
| cyclohexyl MA | — | 8.8 | 7.4 | 9.6 | 9–10 | 5 months |
| " | 20% | 15.3 | 15.7 | 16.6 | 21 |  |
| t-butyl-cyclohexyl MA | — | 5.2 | 7.0 | 7.5 | 5–6 | 1 month |
| t-butyl-cyclohexyl MA | 10% | 8.6 | 10.7 | 14.6 | 10–11 | 2 months |

The tensile shear strengths of the overlapping bondings (bonded area: 250 mm²) were determined according to DIN 53283. With the one-component systems, both parts to be joined were coated with the adhesive and left open for a defined period of time (1 min, min, in some instances 20 min) and then joined. The fixture time is the time after joining for which the bonded joint holds a suspended weight (about 3 kg). The final strengths were determined with one-component and two-component systems 24 hours after bonding using a Zwick tearing machine.

What is claimed is:

1. A composition comprising a compound having the formula:

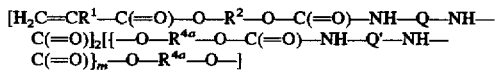

wherein:

m is from 0 to 10;

R¹ is hydrogen or a methyl group;

R² is selected from the group consisting of linear or branched chain alkylene groups containing from 2 to 6 carbon atoms and polyoxyalkylene groups containing from 4 to 21 carbon atoms;

Q and Q' independently are aromatic, aliphatic or cycloaliphatic groups containing from 6 to 18 carbon atoms which are derived from a diisocyanate or diisocyanate mixtures; and $R^{4a}$ is derived from a polyesterdiol which is characterized by a weight ratio of carbon to oxygen of greater than 2.6, a weight ratio of carbon to hydrogen of less than 10, and a molecular weight of from 1000 to 20,000; and an activator system for free-radical polymerization of said compound.

2. The composition according to claim 1 wherein said composition is further comprised of at least one additional compound of the general formula:

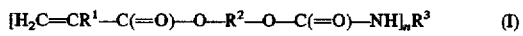

wherein:

R¹ is hydrogen or a methyl group;

R² is selected from the group consisting of linear or branched chain alkylene groups containing from 2 to 6 carbon atoms and polyoxyalkylene groups containing from 4 to 21 carbon atoms;

n is 1, 2, or 3;

provided that when n is 1, R³ is selected from the group consisting of an aryl group containing from 6 to 18 carbon atoms, a linear or branched alkyl group containing from 1 to 18 carbon atoms, and a cycloalkyl group containing from 3 to 12 carbon atoms;

provided further that when n is 2, R³ is:

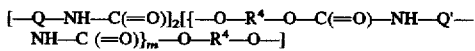

wherein m is from 0 to 10; and

R⁴ is selected from the group consisting of:
a) a polycaprolactonediol residue; and
b) a polytetrahydrofurfuryldiol residue;
provided further that when n is 3, R³ is:

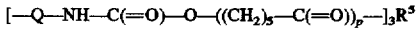

wherein R⁵ is a triol residue of a linear or branched chain trihydric alcohol containing from 3 to 6 carbon atoms, and p is from 1 to 10; and Q and Q' independently are aromatic, aliphatic or cycloaliphatic groups containing from 6 to 18 carbon atoms which are derived from a diisocyanate or diisocyanate mixtures.

3. The composition according to claim 2 wherein said at least one additional compound is comprised of from 0% to 80% by weight of one or more compounds wherein n is 2 or 3 and from 100% to 20% by weight of one or more compounds wherein n is 1.

4. The composition according to claim 2 wherein said composition is further comprised of one or more comonomers selected from the group consisting of acrylate esters and methacrylate esters.

5. The composition according to claim 4 wherein said additional compound and said comonomer is comprised of from 0% to 80% by weight of one or more compounds wherein n is 2 or 3 and from 100% to 20% by weight of a member selected from the group consisting of compounds wherein n is 1 and mixtures of compounds wherein n is 1 and said comonomers.

6. The composition according to claim 4 wherein said additional compound and said comonomer is comprised of from 2% to 80% by weight of one or more compounds wherein n is 2 or 3 and from 98% to 20% by weight of one or more of said comonomers.

7. The composition according to claim 4 wherein said additional compound is comprised of from 10 to 70% by weight of one or more compounds wherein n is 2 or 3 and from 90 to 30% by weight of a member selected from the group consisting compounds wherein n is 1 and said comonomers.

8. The composition according to claim 2 wherein said composition is further comprised of one or more comonomers selected from the group consisting of allyl acrylate, allyl methacrylate, methyl acrylate, methyl methacrylate, 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate, 6-hydroxyhexyl acrylate, 6-hydroxyhexyl methacrylate, benzyl methacrylate, phenylethyl methacrylate, 2-phenoxyethyl methacrylate, morpholinoethyl methacrylate, glycidyl methacrylate, piperidylacrylamide, neopentyl methacrylate, cyclohexyl methacrylate, tert.-butyl methacrylate, and tetrahydrofurfuryl methacrylate, and mixtures thereof.

9. The composition according to claim 2 wherein n is 1 and R³ is selected from the group consisting of methyl, ethyl, propyl, i-propyl, butyl, i-butyl, tert.-butyl, pentyl, hexyl, phenyl, xylenyl, toluenyl, cyclopropyl, cyclobutyl, cyclopentyl, and cyclohexyl groups.

10. The composition according to claim 2 wherein n is 2 and R⁴ is a polycaprolactonediol residue.

11. The composition according to claim 2 wherein n is 2 and R⁴ is a polytetrahydrofurfuryldiol residue.

12. The composition according to claim 2 wherein n is 3.

13. The composition according to claim 1 wherein R² is selected from the group consisting of ethylene, propylene, i-propylene, n-butylene, i-butylene, polyoxyethylene, and polyoxypropylene groups.

14. The composition according to claim 1 wherein Q and Q' are independently derived from diisocyanates which are selected from the group consisting of 2,4-toluenediisocyanate, 2,6-toluenediisocyanate, 4,4'-diphenylmethanediisocyanate, 4,4'-dicyclohexyldiisocyanate, meta- and para-tetramethylxylenediisocyanate, 3-isocyanatomethyl- 3,5,5-trimethylcyclohexylisocyanate, hexamethylenediisocyanate, 1,5-naphthylenediisocyanate, dianisidinediisocyanate, bis(2-isocyanatoethyl)bicyclo [2.2.1]hept-5-ene-2,3-dicarboxylate, 2,2,4- and 2,4,4-trimethylenehexamethylenediisocyanate, and mixtures thereof.

15. The composition according to claim 1 wherein said activator system is a peroxide activator system.

16. The composition according to claim 15 wherein said peroxide activator system is comprised of a peroxide selected from the group consisting of diaryl peroxides, hydroperoxides, peracids, and peresters.

17. The composition according to claim 15 wherein said peroxide activator system is comprised of a peroxide selected from the group consisting of di-tert.-butyl peroxide, dibenzoyl peroxide, cumene hydroperoxide, 2,4-dichlorobenzoyl peroxide, tert.-butyl hydroperoxide, peroxyacetic acid, peroxybenzoic acid, azoisobutyronitrile, and tert.-butyl peroxyacetate.

18. The composition according to claim 15 wherein said peroxide activator system is further comprised of a member selected from the group consisting of tertiary amine compounds with partial aromatic substitution at the nitrogen atom.

19. The composition according to claim 18 wherein said tertiary amine compound is selected from the group consisting of dimethylaniline and dimethyl-p-toluidine.

20. A composition comprising a compound having the formula:

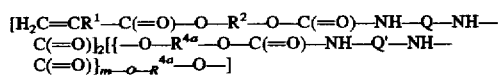

wherein:

m is from 0 to 10;

$R^1$ is hydrogen or a methyl group;

$R^2$ is selected from the group consisting of ethylene, propylene, i-propylene, n-butylene or i-butylene, polyoxyethylene containing from 4 to 20 carbon atoms, and polyoxypropylene groups containing from 6 to 21 carbon atoms;

Q and Q' independently are aromatic, aliphatic or cycloaliphatic groups containing from 6 to 18 carbon atoms which are derived from a diisocyanate which is selected from the group consisting of 2,4-toluenediisocyanate, 2,6-toluenediisocyanate, 4,4'-diphenylmethanediisocyanate, 4,4'-dicyclohexyldiisocyanate, meta- and para-tetramethylxylenediisocyanate, 3-isocyanatomethyl-3,5,5-trimethylcyclohexylisocyanate, hexamethylenediisocyanate, 1,5-naphthylenediisocyanate, dianisidinediisocyanate, bis(2-isocyanatoethyl)bicyclo[2.2.1]hept-5-ene-2,3-dicarboxylate, 2,2,4-and 2,4,4 trimethylenehexamethylenediisocyanate, and mixtures thereof; and $R^{4a}$ is derived from a polyesterdiol which is characterized by a weight ratio of carbon to oxygen of greater than 2.6, a weight ratio of carbon to hydrogen of less than 10, and a molecular weight of from 1000 to 20,000; and a peroxide activator system for free-radical polymerization of said compound.

21. A process for the preparation of the composition according to claim 1 comprising homogenizing said compound and said activator system.

22. The process according to claim 21 wherein said homogenization is performed with exclusion of oxygen.

23. A composition comprising a compound having the formula:

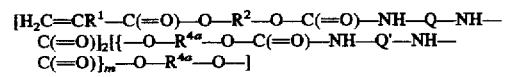

wherein:

m is from 0 to 10;

$R^1$ is hydrogen or a methyl group;

$R^2$ is selected from the group consisting of linear or branched chain alkylene groups containing from 2 to 6 carbon atoms and polyoxyalkylene groups containing from 4 to 21 carbon atoms;

Q and Q' independently are aromatic, aliphatic or cycloaliphatic groups containing from 6 to 18 carbon atoms which are derived from a diisocyanate or diisocyanate mixtures; and $R^{4a}$ is derived from a polyesterdiol which is characterized by a weight ratio of carbon to oxygen of greater than 2.6, a weight ratio of carbon to hydrogen of less than 10, and a molecular weight of from 1000 to 20,000; and one component of a two-component activator system for free-radical polymerization of said compound.

24. A process for the preparation of the composition according to claim 23 comprising homogenizing said compound and said one component of said two-component activator system.

25. In a method for surface coating with a brushable agent, the improvement comprising using as the brushable agent, a composition as claimed in claim 1.

26. In a method for producing molded pads, the improvement comprising using as a molding composition, a composition as claimed in claim 1.

27. In a method of producing a printing ink, the improvement comprising using as an additive to said printing ink, a composition as claimed in claim 1.

28. In a method for bonding parts to be joined, the improvement comprising using as an adhesive, a composition as claimed in claim 1.

29. The method according to claim 28 wherein said composition is further comprised of at least one additional compound of the general formula:

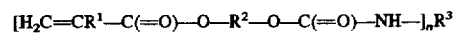

wherein:

$R^1$ is hydrogen or a methyl group;

$R^2$ is selected from the group consisting of linear or branched chain alkylene groups containing from 2 to 6 carbon atoms and polyoxyalkylene groups containing from 4 to 21 carbon atoms;

n is 1, 2, or 3;

provided that when n is 1, $R^3$ is selected from the group consisting of a aryl group containing from 6 to 18 carbon atoms, a linear or branched alkyl group containing from 1 to 18 carbon atoms, and a cycloalkyl group containing from 3 to 12 carbon atoms;

provided further that when n is 2, $R^3$ is:

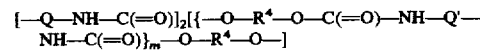

wherein m is from 0 to 10; and $R^4$ is selected from the group consisting of:
a) a polycaprolactonediol residue; and
b) a polytetrahydrofurfuryldiol residue;
provided further that when n is 3, $R^3$ is:

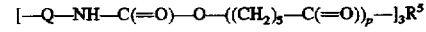

wherein $R^5$ is a triol residue of a linear or branched chain trihydric alcohol containing from 3 to 6 carbon atoms, and p is from 1 to 10; and Q and Q' independently are aromatic, aliphatic or cycloaliphatic groups containing from 6 to 18 carbon atoms which are derived from a diisocyanate or diisocyanate mixtures.

30. The method according to claim 29 wherein said at least one additional compound is comprised of from 0% to 80% by weight of one or more compounds wherein n is 2 or 3 and from 100% to 20% by weight of one or more compounds wherein n is 1.

31. The method according to claim 29 wherein said composition is further comprised of one or more comonomers selected from the group consisting of acrylate esters and methacrylate esters.

32. The method according to claim 31 wherein said additional compound and said comonomer is comprised of from 0% to 80% by weight of one or more compounds wherein n is 2 or 3 and from 100% to 20% by weight of a member selected from the group consisting of compounds wherein n is 1 and mixtures of compounds wherein n is 1 and said comonomers.

33. The method according to claim 31 wherein said additional compound and said comonomer is comprised of from 2% to 80% by weight of one or more compounds wherein n is 2 or 3 and from 98% to 20% by weight of a member selected from the group consisting of compounds wherein n is 1 and mixtures of compounds wherein n is 1 and said comonomers.

34. The composition according to claim 31 wherein said additional compound is comprised of from 10 to 70% by weight of one or more compounds wherein n is 2 or 3 and from 90 to 30% by weight of a member selected from the group consisting compounds wherein n is 1 and said comonomers.

35. The method according to claim 29 wherein said composition is further comprised of one or more comonomers selected from the group consisting of allyl acrylate, allyl methacrylate, methyl acrylate, methyl methacrylate, 2-hydroxyethyl acrylate, 2-hydroxyethyl methacrylate, 2-hydroxypropyl acrylate, 3-hydroxypropyl acrylate, 2hydroxypropyl methacrylate, 3-hydroxypropyl methacrylate, 6-hydroxyhexyl acrylate, 6-hydroxyhexyl methacrylate, benzyl methacrylate, phenylethyl methacrylate, 2-phenoxyethyl methacrylate, morpholinoethyl methacrylate, glycidyl methacrylate, piperidylacrylamide, neopentyl methacrylate, cyclohexyl methacrylate, tert.-butyl methacrylate, and tetrahydrofurfuryl methacrylate, and mixtures thereof.

36. The method according to claim 29 wherein n is 1 and $R^3$ is selected from the group consisting of methyl, ethyl, propyl, i-propyl, butyl, i-butyl, tert.-butyl, pentyl, hexyl, phenyl, xylenyl, toluenyl, cyclopropyl, cyclobutyl, cyclopentyl, and cyclohexyl groups.

37. The method according to claim 29 wherein n is 2 and $R^4$ is a polycaprolactonediol residue.

38. The method according to claim 29 wherein n is 2 and $R^4$ is a polytetrahydrofurfuryldiol residue.

39. The method according to claim 29 Wherein n is 3.

40. The method according to claim 28 wherein $R^2$ is selected from the group consisting of ethylene, propylene, i-propylene, n-butylene, i-butylene, polyoxyethylene, and polyoxypropylene groups.

41. The method according to claim 28 wherein Q and Q' are independently derived from diisocyanates which are selected from the group consisting of 2,4-toluenediisocyanate, 2,6-toluenediisocyanate, 4,4'-dicyclohexyldiisocyanate, meta- and para-tetramethylxylenediisocyanate, 3-isocyanatomethyl-3,5,5-trimethylcyclohexylisocyanate, hexamethylenediisocyanate, 1,5-naphthylenediisocyanate, dianisidinediisocyanate, bis(2-isocyanatoethyl) bicyclo[2.2.1]hept-5-ene-2,3-dicarboxylate, 2,2,4- and 2,4,4-trimethylenehexamethylenediisocyanate, and mixtures thereof.

42. The method according to claim 28 wherein said activator system is a peroxide activator system.

43. The method according to claim 42 wherein said peroxide activator system is comprised of a peroxide selected from the group consisting of diaryl peroxides, hydroperoxides, peracids, and peresters.

44. The method according to claim 42 wherein said peroxide activator system is comprised of a peroxide selected from the group consisting of di-tert.-butyl peroxide, dibenzoyl peroxide, cumene hydroperoxide, 2,4-dichlorobenzoyl peroxide, tert.-butyl hydroperoxide, peroxyacetic acid, peroxybenzoic acid, azoisobutyronitrile, and tert.-butyl peroxyacetate.

45. The method according to claim 42 wherein said peroxide activator system is further comprised of a member selected from the group consisting of tertiary amine compounds with partial aromatic substitution at the nitrogen atom.

46. The method according to claim 45 wherein said tertiary amine compound is selected from the group consisting of dimethylaniline and dimethyl-p-toluidine.

47. In a method for bonding parts to be joined, the improvement comprising using as an adhesive, a composition comprising a compound having the formula:

[H$_2$C=CR$^1$—C(=O)—O—R$^2$—O—C(=O)—NH—Q—NH—C(=O)]$_b${—O—R$^{4a}$—O—C(=O)—NH—Q'—NH—C(=O)}$_m$—O—R$^{4a}$—O—]

wherein:

m is from 0 to 10;

$R^1$ is hydrogen or a methyl group;

$R^2$ is selected from the group consisting of ethylene, propylene, i-propylene, n-butylene or i-butylene, polyoxyethylene containing from 4 to 20 carbon atoms, and polyoxypropylene groups containing from 6 to 21 carbon atoms;

Q and Q' independently are aromatic, aliphatic or cycloaliphatic groups containing from 6 to 18 carbon atoms which are derived from a diisocyanate which is selected from the group consisting of 2,4-toluenediisocyanate, 2,6-toluenediisocyanate, 4,4'-diphenylmethanediisocyanate, 4,4'-dicyclohexyldiisocyanate, meta- and para-tetramethylxylenediisocyanate, 3-isocyanatomethyl-3,5,5-tri methylcyclohexyl isocyanate, hexamethylenediisocyanate, 1,5-naphthylenediisocyanate, dianisidinediisocyanate, bis(2-isocyanatoethyl)bicyclo[2.2.1]hept-5-ene-2,3-dicarboxylate, 2,2,4- and 2,44trimethylenehexamethylenediisocyanate, and mixtures thereof; and $R^{4a}$ is derived from a polyesterdiol which is characterized by a weight ratio of carbon to oxygen of greater than 2.6, a weight ratio of carbon to hydrogen of less than 10, and a molecular weight of from 1000 to 20,000; and a peroxide activator system for free-radical polymerization of said compound.

* * * * *